(12) United States Patent
Otto

(10) Patent No.: US 6,923,628 B1
(45) Date of Patent: Aug. 2, 2005

(54) VACUUM PUMP

(75) Inventor: Dieter Otto, Ennepetal (DE)

(73) Assignee: Luk, Automobitechnik GmbH, Hückeswagen (DE)

( * ) Notice: Subject to any disclaimer, the term of this patent is extended or adjusted under 35 U.S.C. 154(b) by 0 days.

(21) Appl. No.: 09/787,651

(22) PCT Filed: Sep. 24, 1999

(86) PCT No.: PCT/EP99/07111

§ 371 (c)(1),
(2), (4) Date: Jun. 28, 2001

(87) PCT Pub. No.: WO00/19104

PCT Pub. Date: Apr. 6, 2000

(30) Foreign Application Priority Data

Sep. 30, 1998 (DE) .......................... 298 23 809 U

(51) Int. Cl.[7] .............................................. F04C 15/00
(52) U.S. Cl. .................... 418/152; 418/150; 418/125; 418/255; 464/100; 464/101
(58) Field of Search .............................. 418/152, 255, 418/125, 257, 150, 151; 464/100, 101

(56) References Cited

U.S. PATENT DOCUMENTS

| | | | | |
|---|---|---|---|---|
| 1,452,024 A | * | 4/1923 | Campbell | 418/127 |
| 2,287,369 A | | 6/1942 | Anderson | |
| 2,897,662 A | * | 8/1959 | Gondek | 464/100 |
| 3,016,723 A | * | 1/1962 | Gondek | 464/100 |
| 3,053,438 A | * | 9/1962 | Meyer | 464/100 |
| 3,191,852 A | * | 6/1965 | Kaatz et al. | 418/152 |
| 3,193,190 A | * | 7/1965 | Lindberg | 418/152 |
| 3,207,078 A | * | 9/1965 | Cook | 418/152 |
| 3,207,079 A | * | 9/1965 | Cook et al. | 418/152 |
| 3,260,210 A | * | 7/1966 | Gram | 464/100 |
| 3,335,944 A | * | 8/1967 | Conde et al. | 418/152 |
| 3,452,725 A | * | 7/1969 | Kelly | 418/152 |
| 3,734,654 A | * | 5/1973 | Burenga et al. | 418/152 |
| 4,080,123 A | | 3/1978 | Melchinger | |
| 4,144,005 A | * | 3/1979 | Brucken | 418/255 |
| 4,422,419 A | * | 12/1983 | Umeda | 418/150 |
| 4,604,041 A | * | 8/1986 | Hertell et al. | 418/82 |
| 4,616,984 A | * | 10/1986 | Inagaki et al. | 418/255 |
| 4,929,159 A | * | 5/1990 | Hayase et al. | 418/255 |
| 5,037,283 A | * | 8/1991 | Kapur et al. | 418/255 |
| 5,181,843 A | * | 1/1993 | Hekman et al. | 418/125 |
| 5,421,706 A | * | 6/1995 | Martin, Sr. | 418/255 |
| 5,429,084 A | | 7/1995 | Cherry et al. | |
| 5,707,222 A | * | 1/1998 | Otto | 418/255 |
| 5,772,106 A | | 6/1998 | Ayers et al. | |

FOREIGN PATENT DOCUMENTS

DE          1 956 184        11/1969

(Continued)

OTHER PUBLICATIONS (225768) Annex to the International Preliminary Examination Report (English translation).

(Continued)

*Primary Examiner*—Theresa Trieu
(74) *Attorney, Agent, or Firm*—Bateman IP Law Group

(57) ABSTRACT

A vacuum pump, in particular for brake booster systems in motor vehicles, with a drivable rotor via which a blade in a housing can be set in rotation is proposed. The vacuum pump is distinguished by the fact that the rotor consists of plastic and is formed as one piece.

91 Claims, 7 Drawing Sheets

FOREIGN PATENT DOCUMENTS

| | | | | |
|---|---|---|---|---|
| DE | 23 48 441 A1 | | 9/1973 | |
| DE | 2622164 | * | 12/1977 | ............... 418/255 |
| DE | 27 27 328 | | 12/1978 | |
| DE | 155 102 | | 12/1980 | |
| DE | G 87 00 135.7 | | 3/1987 | |
| DE | 19834033 | * | 2/1999 | ............... 418/255 |
| EP | 264749 | * | 4/1988 | ............... 418/255 |
| GB | 620901 | | 3/1949 | |
| JP | 59-155595 | * | 9/1984 | ............... 264/241 |
| JP | 59155595 | | 9/1984 | |
| JP | 60-095198 | * | 5/1985 | ............... 418/152 |
| JP | 61-149594 | * | 7/1986 | ............... 418/255 |
| JP | 04-159483 | * | 6/1992 | ............... 418/255 |

OTHER PUBLICATIONS

Mayer, Josef, "Rotary piston pump, particularly for processing milk products or similar materials," Oct. 10, 1966.

* cited by examiner

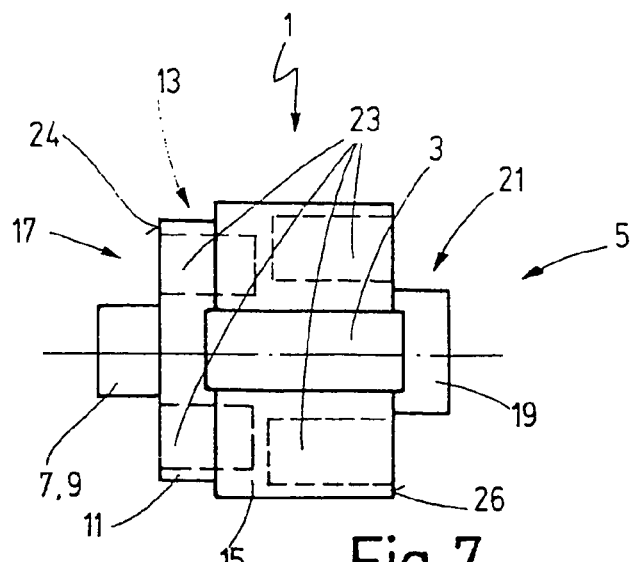
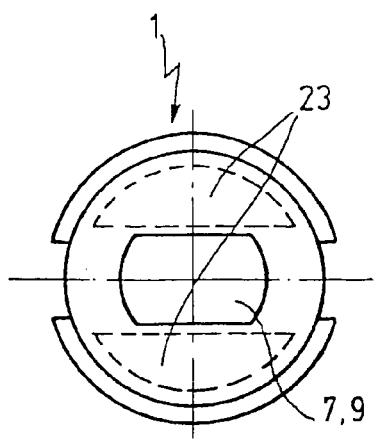
Fig. 7
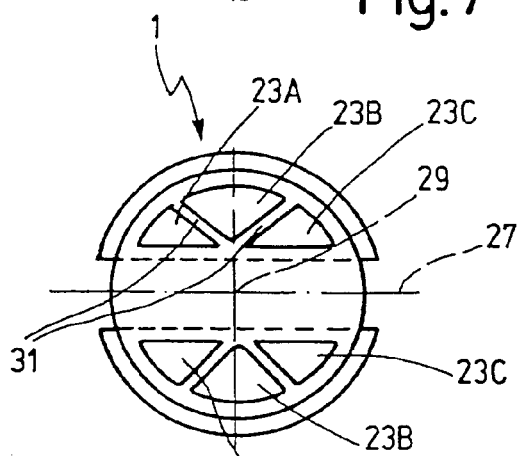
Fig. 8A　　　Fig. 8B
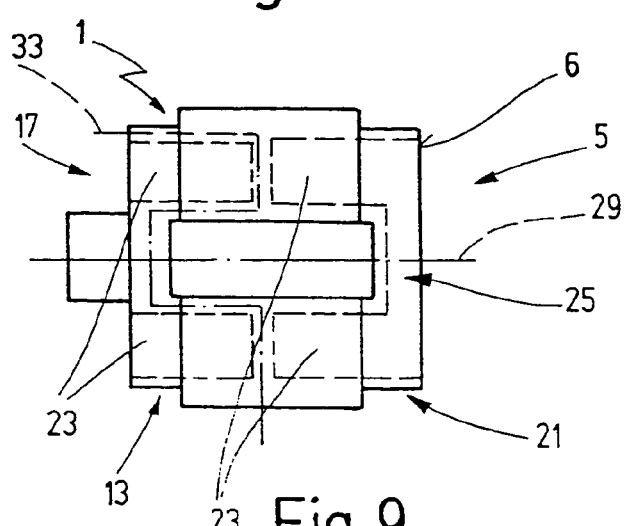
Fig. 9

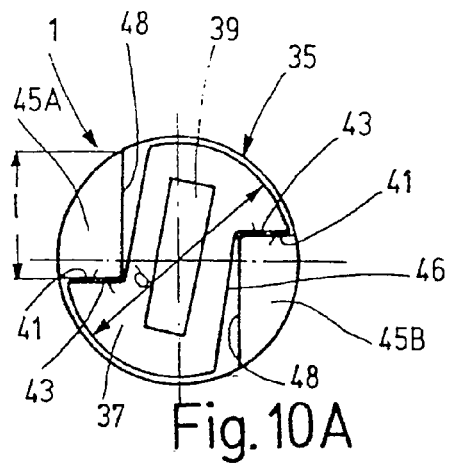
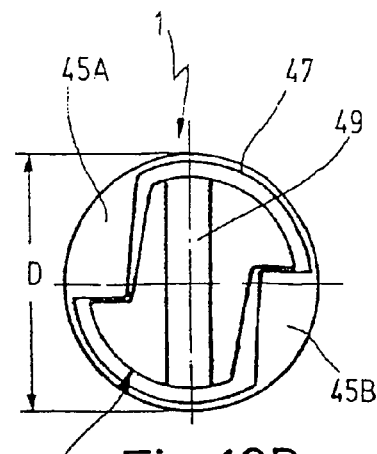
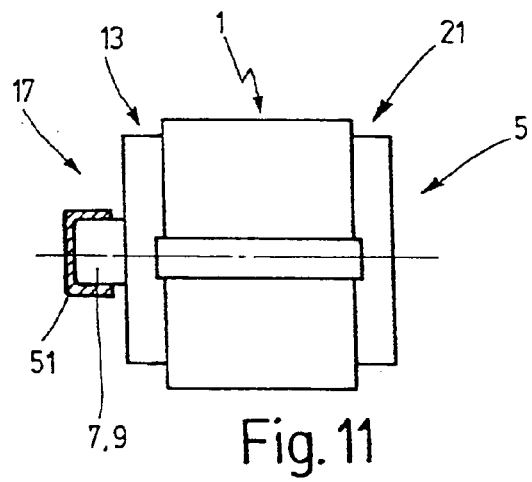
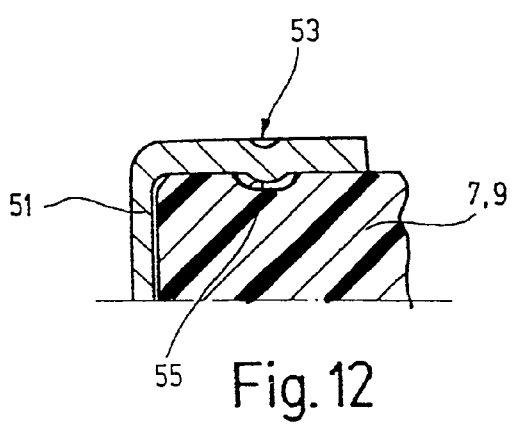
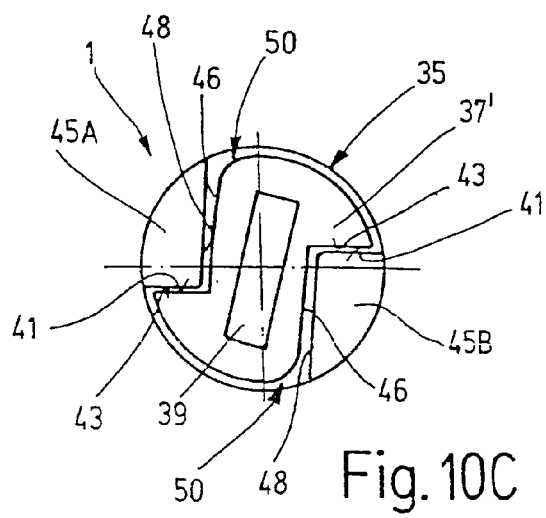

VACUUM PUMP

The present Application is the National Phase of PCT/EP99/07111, filed Sep. 24, 1999, claiming priority to German Patent App. No. 29823809.8, filed Sep. 30, 1998.

The invention relates to a vacuum pump, in particular for brake booster systems in motor vehicles, according to the preamble of claim 1.

BACKGROUND OF THE INVENTION

Vacuum pumps of the type addressed here are known. They have a rotor consisting of metal, usually sintered metal, which can be set in rotation by a drive shaft. The rotor disposed in a housing is in engagement with a blade which slides along a contour ring. The rotor consists of several individual parts which are removably connected to one another. It has been shown that the rotor has great inertia due to its weight, whereby the power consumption of the vacuum pump is undesirably high. The rotor furthermore has a massive and expensive structure.

SUMMARY OF THE INVENTION

It is thus the objective of the invention to provide a vacuum pump of the type stated initially which does not have these disadvantages.

For the realization of this objective a vacuum pump is proposed which has the features stated in claim 1. It is distinguished by the fact that the rotor consists of plastic and is formed as one piece. The rotor can be produced in a simple and cost-effective manner, for example in the injection-molding process, and has, in comparison to the prior-art rotors, a lighter weight. Due to the unipartite form of the rotor, a compact structure is possible so that the space needed for the vacuum pump can be reduced. The power consumption of the vacuum pump is relatively low due to the low inertia of the rotor.

An exemplary embodiment of the vacuum pump is preferred in which the rotor has at least one cavity open at the edge. In case of the preferred production of the rotor in the injection-molding process the cavity or cavities can be produced in a simple manner by the laying into the injection mold of correspondingly formed cores. By the introduction of cavities in the rotor, thin walls can be realized, for example outwards up to a slot in which the blade can be displaced. Furthermore, the weight of the rotor, which is already lighter because it consists of plastic, can be reduced.

An exemplary embodiment of the vacuum pump is also preferred which is distinguished by the fact that the curve of wall thickness of the rotor is continuous or essentially continuous. That is, the transition between two wall areas having a different thickness is uniform and has no clear discontinuities in wall thickness.

An exemplary embodiment of the vacuum pump is also preferred in which the rotor has at least two cavities disposed next to one another, said cavities being separated from one another by a rib. The rigidity of form of the rotor is increased further by the ribbing. The rib formed between two cavities is preferably thinner than the other wall of the rotor. Thereby points of incidence in the transitional area of the rib and a wall of the rotor are avoided. In the case of a preferred exemplary embodiment the thickness of the rib or ribs lies in the range of 1.0 mm to 2.0 mm while the wall thicknesses of the rotor in comparison thereto then preferably lie in the range 1.5 mm to 3.0 mm.

A form of embodiment of the vacuum pump is also particularly preferred which is distinguished by the fact that the rotor has at least one closed wall running transversely or essentially transversely to the central longitudinal axis of the rotor. Thereby it can be insured that in the case of a rotor having a cavity no air can reach from the drive side through the rotor into the vacuum pump. Therefore no additional seals are necessary.

In the case of a preferred exemplary embodiment of the vacuum pump it is provided that the rotor has an elastic drive element working together with a drive shaft. Through the drive element, which is in engagement with the rotor directly or via a coupling, the torque spikes or oscillations transmitted from the drive shaft coupled to, for example, the internal combustion engine of a motor vehicle, as, for example, occur in the case of direct-injection motors, are damped so that a break of the motor is avoided with high reliability.

In the case of an advantageous form of embodiment the drive element consisting, for example of metal, preferably spring metal, is formed as a torsion rod which is twisted under the torque conducted. Thus, for example in the case of an exemplary embodiment in which the rotor is driven by the internal combustion engine of the motor vehicle, any torque spikes, such as occur, for example during the cold start of the vacuum pump and/or in connection with direct injection motors, can be smoothed and clearly reduced.

Finally, an exemplary embodiment of the vacuum pump is also preferred which is distinguished by the fact that the drive element projects into a slot in the drive shaft and is displaceably guided in it. Thereby a shift of the axis between the vacuum pump and the drive shaft can be compensated in an advantageous manner without a coupling being needed for that purpose. A compensation of a shift of the axis perpendicularly to the slot can be compensated in the case of a fixed connection of the drive element to the rotor by the bending of the drive element in its elastic range. If the drive element is loosely connected to the rotor so that it can execute a relative motion with respect to the rotor, then a shift of the axis perpendicularly to the slot can be compensated by a tilting of the drive element.

According to an extension of the invention it is provided that the rotor can be driven with the aid of the internal combustion engine of a motor vehicle. In the case of another exemplary embodiment of the vacuum pump the rotor can also be driven by a motor, in particular an electric motor, when the vacuum pump is used in a motor vehicle, for example in connection with a brake booster system of the motor vehicle. The motor can, for example, also be operated hydraulically or pneumatically. In the case of an additional variation of embodiment the rotor is optionally drivable by the internal combustion engine or the motor.

Additional advantageous forms of embodiment follow from the subordinate claims.

BRIEF DESCRIPTION OF THE DRAWINGS

The invention will be explained in more detail in the following with the aid of the drawings. Shown are:

FIGS. 2 to 7 each a lateral view and a frontal view of additional exemplary embodiments of the rotor;

FIGS. 8A and 8B each a plan view of the frontal side turned away from the drive of additional exemplary embodiments of the rotor;

FIG. 9 a lateral view of an additional exemplary embodiment of the rotor;

FIGS. 10A to 10C each a plan view of the drive-side frontal side of several exemplary embodiments of a rotor driven via a coupling;

FIG. 11 a lateral view of a rotor with a drive tongue which is provided with a cap;

FIG. 12 a greatly enlarged extract of the rotor according to FIG. 11 in the area of the drive tongue;

DETAILED DESCRIPTION OF THE INVENTION

It is common to each of the exemplary embodiments of the rotor for a vacuum pump described in the following that it is formed as one piece and consists of plastic. The rotor can be produced in an advantageous manner in the injection-molding process and has only a light weight.

Figure 1:
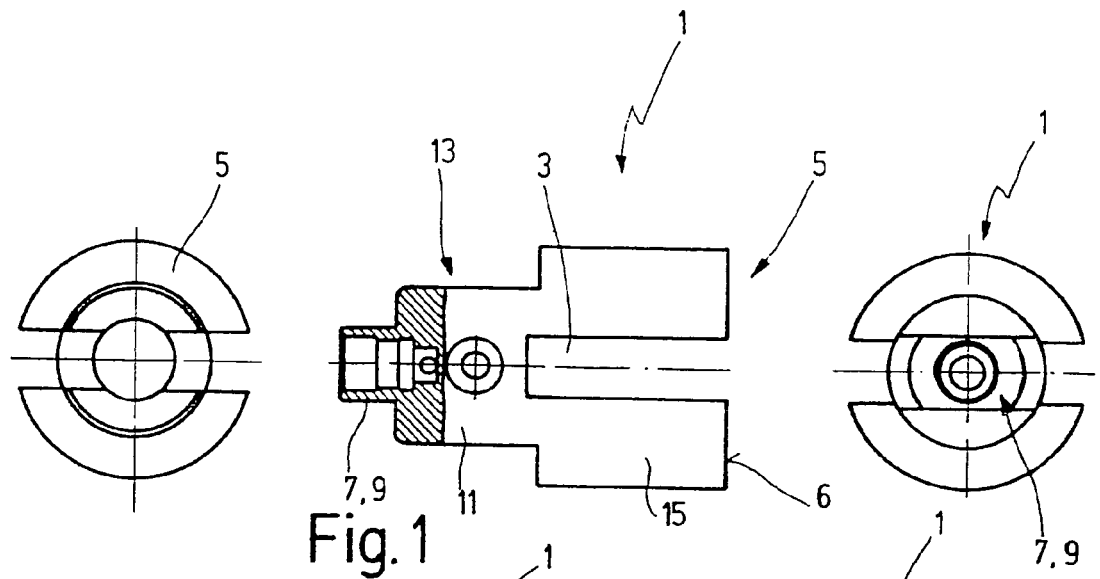
FIG. 1 three images of a first exemplary embodiment of a rotor mounted on one side of a vacuum pump.

FIG. 1 shows three images of a first exemplary embodiment of the rotor 1 of a vacuum pump not represented, said rotor being provided with a slot 3 passing through. The slot 3 serves to accommodate a blade not represented which can be displaced within the slot 3 in the direction of the diameter. In the case of this exemplary embodiment the slot 3 is introduced into a frontal face 6 from the frontal side 5 turned away from the drive of the rotor 1, and therefore is formed open at the edge. A drive shaft which can be energized with a torque usually serves as drive. The outer face of the rotor 1 is formed cylindrically.

A first longitudinal section 7 of the rotor formed as the double surface 9 to which a torque transmitted from the drive shaft not represented is applied. Adjacent to the first longitudinal section 7 is a second longitudinal section 11 which has a greater outer diameter than the first adjacent to the first longitudinal section 7. The second longitudinal section 11 serves as the support 13 of the rotor 1 mounted fluidly here. A sliding support is preferably provided as the type of support. Adjacent to the support 13 is a third longitudinal section 15 of greater diameter which, seen in the radial direction, is penetrated by the slot 3 for the blade.

Figure 2:
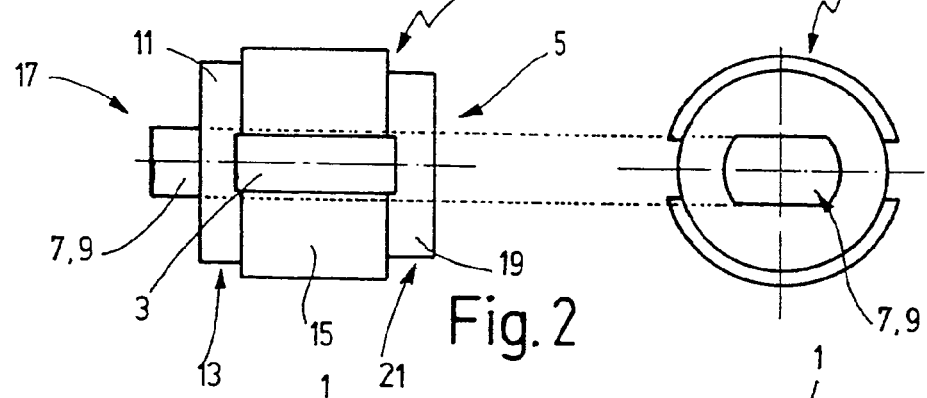

FIG. 2 shows a lateral view and a frontal view of the drive-side frontal side 17 of an additional exemplary embodiment of the rotor 1 which has two supports. A sliding support is also preferred for the support of the rotor on both sides. The second longitudinal section 11 of the rotor 1 forms the first support 13 and a fourth longitudinal section 19 adjacent to the third longitudinal section 15 forms the second support 21. Both supports 13 and 21 have diameters which are only negligibly, preferably 1 mm to 5 mm, smaller than the diameter of the rotor in the area of the slot 3 for the blade which is introduced in the third longitudinal section 15. The outer diameters of the supports 13 and 21 are different here and can also be identical in the case of another exemplary embodiment.

The support of the rotor 1 on both sides has, with respect to support on one side only, functional advantages as well as advantages in production. The functional advantages consist of the fact that the rotor is not anchored in the support or supports as it has been until now in the case of a rotor supported on one side. Furthermore, a compact structure of the rotor can be realized because both supports can be made to be very short. Furthermore, a rotor supported on both sides has a high stability of form. Due to the high stability of form of the rotor narrow tolerances can be adhered to in the production of the rotor.

Figure 3:
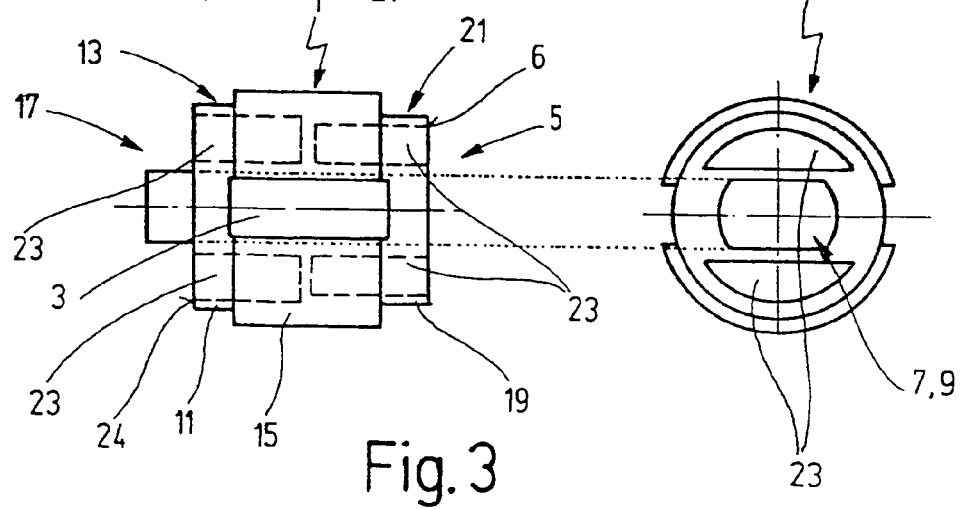

FIG. 3 shows two images of an additional exemplary embodiment of the rotor 3 which is distinguished from the rotor described with the aid of FIG. 2 merely by the fact that cavities are provided in the rotor for the reduction of its weight. On the rotor 1's frontal side 17 facing the drive two cavities 23 are introduced both into the frontal face 24 of the support 13 and on the frontal side 5 turned away from the drive into the frontal face 6, said cavities having a cross-section in the form of a circular arc, as can be seen from the right image of FIG. 3. In the left image of FIG. 3 it can be seen that the cavities 23 extend into the central area of the rotor or the third longitudinal section 15. The wall area remaining between the cavities disposed opposite one another has only a slight thickness. Furthermore, walls are formed by the cavities, for example the outer wall of the rotor in the area of the supports 13 and 21 which have only a slight thickness. Also the walls between the slot 3 for the blade and the cavities are relatively thin. The form of the cavities can vary and can be circular or oval. It is important that thin walls are provided by the introduction of the cavities so that the weight of the rotor can be reduced. The transition between two walls which have a different thickness is preferably continuous.

Figure 4:
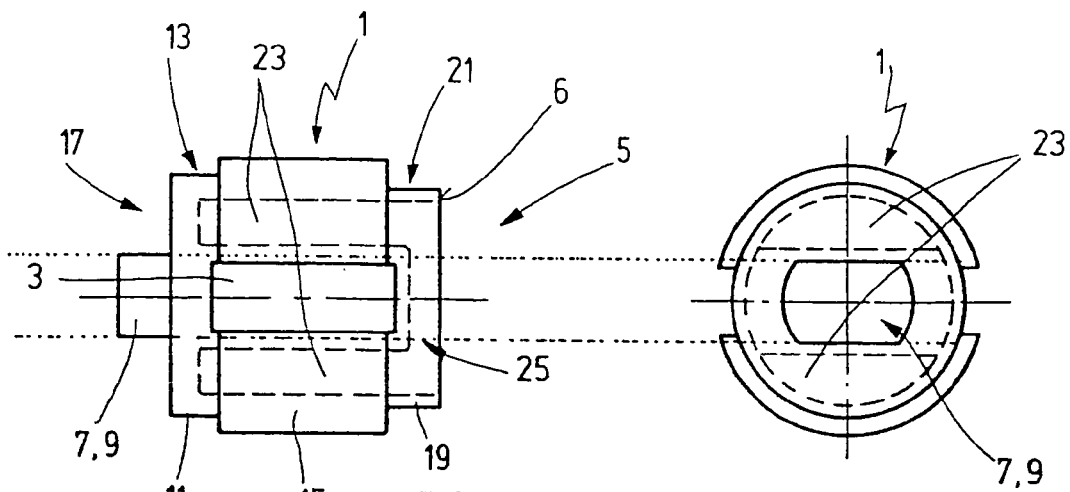

FIG. 4 shows a lateral view and a plan view of the drive-side frontal side 17 of an additional exemplary embodiment of the rotor in which cavities 23 are introduced exclusively on the frontal side 5 turned away from the drive. A circular indentation 25 is introduced into the frontal face 6, said indentation extending in its central area up to directly at the slot 3. In the base of the indentation 25 cavities in the form of a circular arc are introduced which extend up to into the second longitudinal section 1, therefore through the entire rotor up to the first support 13. It is common to all the exemplary embodiments that cavities are introduced in them, if only from a frontal side, which preferably will be the frontal side 5 of the rotor turned away from the drive side.

Figure 5:
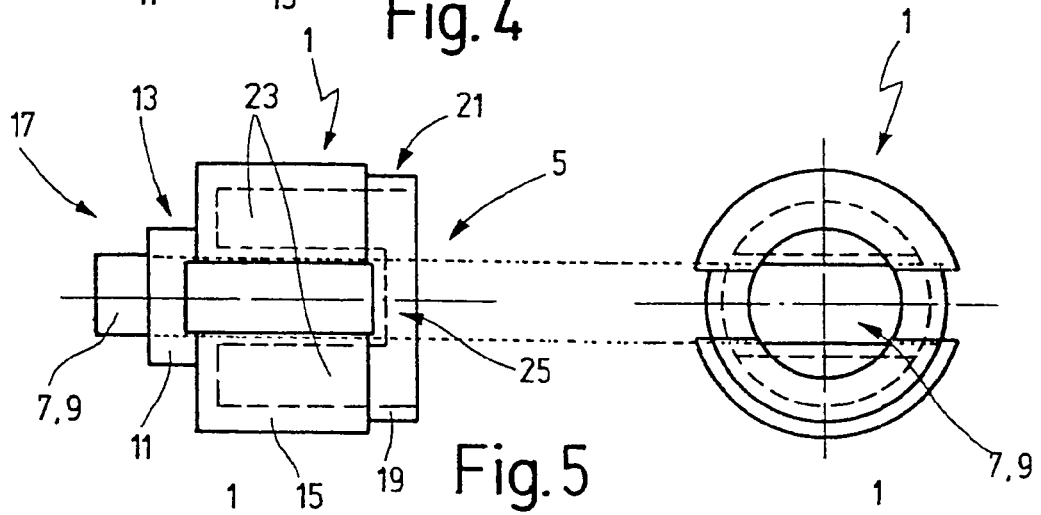

In the case of the exemplary embodiment of the rotor 1 represented in FIG. 5 the support 13 disposed on the drive side has a diameter which is clearly smaller than the diameter of the rotor 1 in the area of the slot 3, therefore in the third longitudinal section 15. It has been shown that a smaller centering diameter of the vacuum pump can be realized by the small outer diameter of the support 13. Here the second support 21 turned away from the drive side is negligibly smaller in diameter in the area of the blade 3 than the rotor 1. Here the cavities 23 and the indentation 25 are also introduced into the rotor 1 from the frontal side 5.

Figure 6:
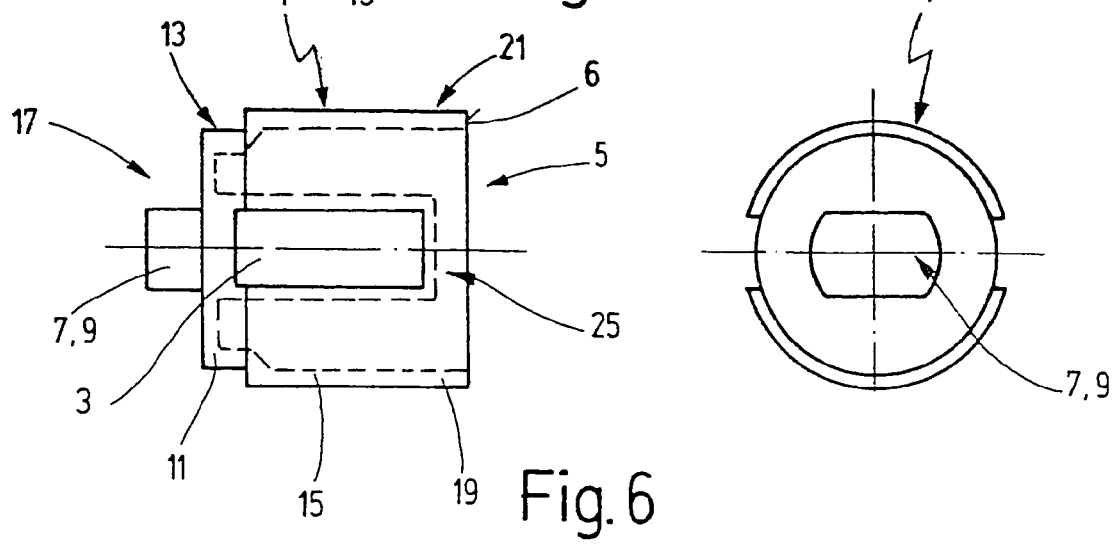

FIG. 6 shows two images of an additional exemplary embodiment of the rotor in which the diameter of the second support 21 and that of the third longitudinal section 15, in which the slot 3 for the blade is introduced, are identical. The advantage therein is that by the indentation 25 introduced into the frontal face 6 on the frontal side 5 and the cavities 23 adjacent thereto an extremely thin and technologically optimal wall thickness in the outer area of the rotor is possible. This lies in the case of a rotor consisting of plastic preferably in a range from 1.5 mm to 3.0 mm. Obviously, it is also possible that both supports 13 and 21 have the same diameter as the rotor 1 in the area of the blade slot. It is also conceivable that only the first support 13 disposed on the drive side has the same diameter as the rotor in the area of the third longitudinal section 15 having the slot 3, while the second support 21 has a smaller diameter.

In the case of the exemplary embodiment of the rotor 1 represented in FIG. 7 the second support 21, which is provided on the frontal side 5 of the rotor 1 turned away from the drive, has a diameter which is significantly smaller than the diameter of the rotor 1 in the area of its third longitudinal section 15. In order to provide thin walls two cavities 23 are introduced into each of the frontal faces 24 of the second longitudinal section 11 and the frontal face 26 of the third longitudinal section 15, said cavities having a cross-section in the form of a circular arc, as can be seen from the right image of FIG. 7. Due to this structure thin walls can be realized in the area between the rotor's outer diameter in the area of the third longitudinal section 15 and in the area of the second support 21.

FIG. 8A shows a frontal view of the frontal side 5 turned away from the drive of an exemplary embodiment of the rotor 1, from which several cavities are introduced. The rotor 1 is formed symmetrically to a transverse axis 27 which runs perpendicularly to the central longitudinal axis 29 of the rotor 1. Thus merely the cavities above the transverse axis 27 are described in the following. The cavities, three in all, 23A, 23B, and 23C are disposed at a small distance from one another. The cavity 23B is separated from each of the cavities 23A and 23C by a rib 31 which is formed by a wall of the rotor 1 formed as one-piece. The ribs 31 increase the rigidity of form of the rotor 1 and are preferably thinner than the other walls of the rotor in order to avoid points of incidence, therefore tapering or constrictions in the wall areas, in which the ribs merge into the remaining wall areas of the rotor 1. Due to the arrangement and the structure of the cavities 23A to 23C they have in common the form of a circular arc, where due to the V-shaped arrangement of the ribs 31 the central cavity 23B has a cross-section in the form of a circular arc. Due to the form of the cavities thin walls are also realized here, in particular in the outlying areas of the rotor.

The exemplary embodiment of the rotor 1 represented in FIG. 8B is distinguished from that described with the aid of FIG. 8A merely by the fact that here the ribs 31 are disposed at a distance from and parallel to one another. It becomes clear that the arrangement of the ribs can be varied and is determined preferably as a function of the required rigidity characteristics.

FIG. 9 shows a lateral view of an additional exemplary embodiment of the rotor 1 from whose frontal sides 17 and 5 cavities 23 or an indentation 25 and cavities 23 adjacent thereto are introduced in the supports 13 and 21. The cavities 23 extend up to into the central area of the rotor. The rotor 1 has a roofed, closed wall (33) running essentially transversely to its central longitudinal axis (29), the curve of said wall being represented with a dotted line. The wall 23 extends, seen transversely to the longitudinal extension of the rotor, over the entire cross-section of the rotor and contains here the first, support 13 facing the drive shaft.

Thereby it is ensured that despite the cavities 23 no air can reach into the vacuum pump from the drive side through the rotor 1.

It is common to all the exemplary embodiments of the rotor 1 that the rotor can be set in rotation by the drive shaft either directly or via a coupling. Which of the two drive capabilities comes into use depends, i.e., on the magnitude of the drive moment, the uniformity of rotation of the drive shaft, and any possible shift of axis between the rotor and the drive shaft. In the following two exemplary embodiments of a coupling are described with the aid of FIGS. 10A and 10B, which each show a plan view of the frontal side 17 facing the drive shaft.

The coupling 35 represented in FIG. 10A is formed by a disk 37 into whose central area a long rectangular hole 39 is introduced which penetrates the disk 37. The long hole 39, into which the drive shaft engages with a correspondingly formed section, makes possible a compensation of a shift of the axis between the vacuum pump and the drive shaft. The disk is preferably formed in such a manner that is can be produced by stamping. The one disk 37 having a circular cross-section has two recesses introduced in the circumference on opposite sides, whereby a bearing surface 41 for each is formed which, as is represented in FIG. 10A, is preferably plane. To transmit a torque from a drive shaft to the rotor 1 each bearing face 41 can be pressed on an opposing surface 43 provided on the rotor 1. From FIG. 10A it can be seen that the form of the recess is chosen so that despite a small diameter d of the disk 37 the bearing surfaces between the rotor 1 and the coupling are large. Due to the large bearing surfaces the pressure of the surface in these areas is small so that hardening of the coupling, in case it consists of steel or sintered iron, can be omitted in given cases. In the case of a preferred exemplary embodiment it is provided that the ratio of the thickness b and the diameter d of the disk 37 lies in a range of $0.1 \leq b/d \leq 0.3$.

The opposing surfaces 43 are each located on a drive segment 45A or 45B connected as one piece to the rotor which projects over the frontal face 24 of the first support 13 in the manner of a dome. The distance between the drive segments 45A and 45B as well as their form is chosen so that the coupling is disposed with play between the drive segments and they can be pivoted about their central longitudinal axis over a small angular range. The rotor 1 has in its drive area a very stable form. This became possible in particular since here a very large support length l of the drive segments 45A and 45B in the direction of force is realized. Thus a ratio of the length l of the support length l and the diameter D of the rotor 1 is preferably realized which lies in a range of $0.35 \leq l/D \leq 0.65$.

In the exemplary embodiment of the rotor represented in FIG. 10B the drive segments 45A and 45B are connected to one another by a closed ring 47 whereby the rigidity of form of the rotor 1 can be increased. Furthermore, the ring 47 can also be used as a support, in particular a sliding support, for the rotor. This form of embodiment of the rotor has very compact structure in the axial direction.

In the case of the variation of embodiment of the coupling 35 represented in FIG. 10B a double surface 49 is provided in its central area instead of a long hole, said double surface engaging in a correspondingly formed slot in the drive shaft. Via the double surface 49 the torque is transmitted from the drive shaft to the coupling.

FIG. 10C shows a plan view of the frontal side 17 of the rotor 1 described with the aid of FIG. 10A in an additional form of embodiment of a coupling 35 which is formed by a disk 37'. The same parts are provided with the same reference numbers so that reference should be made to their description in FIG. 10A. In the circumference of the disk 37' two identical recesses are introduced whereby for each a plane bearing surface 41 and a lateral wall 46 running perpendicular or essentially perpendicular to the bearing surface 41 is formed. As can be seen from FIG. 10C when the bearing surfaces 41 of the disk 37' lie on the opposing surfaces 43 of the rotor the lateral walls 46 are disposed parallel to a partial wall 48 of the drive segment 45A or 45B disposed at a distance, while in the case of the exemplary embodiment represented in FIG. 10A in this position of the coupling the lateral walls 46 are inclined with respect to the partial walls 48 of the drive segments or make an acute angle with them. The transitions 50 between the lateral walls 46 and the circumferential surface of the disk 37' are rounded in the case of this exemplary embodiment and have no sharp edges. If oscillations in the torque should occur in the operation of the vacuum pump, as can arise, for example, in the case of direct-injection motors, which leads a striking of the disk 37' in the area of its transitions 50 to the drive segments 45A and 45B, damage of the partial walls 80 of the drive segments consisting of plastic is avoided.

FIG. 11 shows, described with the aid of the preceding figures, an exemplary embodiment of the rotor 1 which has a first longitudinal section 7 formed as a double surface 9. The tongue-like double surface 9 is provided with a vat-like cap preferably consisting of sheet metal, said cap being able to be pressed or clipped onto the double surface. It is also possible that the cap is already laid in on injection of the rotor into the injection mold and thus is connected irremovably to it during its production. The cap 51 protects the double surface 9, whose strength is sufficient for the transmission of the required torque, against wear which is caused by a relative motion between the double surface and a coupling, or in the case of direct driving of the rotor, i.e., without a coupling, between the double surface and the drive shaft.

FIG. 12 shows a greatly enlarged extract of the cap 51 mounted on the first longitudinal section 7 which has at least one pressure point 53 whereby on the inner side of the cap 51 a forward arch is formed which engages form-lockingly in an indentation 55 introduced in the double surface of the rotor [sic] 7. Thereby the cap 51, which is elastic and/or consists of an elastic material, can be clipped onto the double surface 5 in a simple manner.

Figure 13:
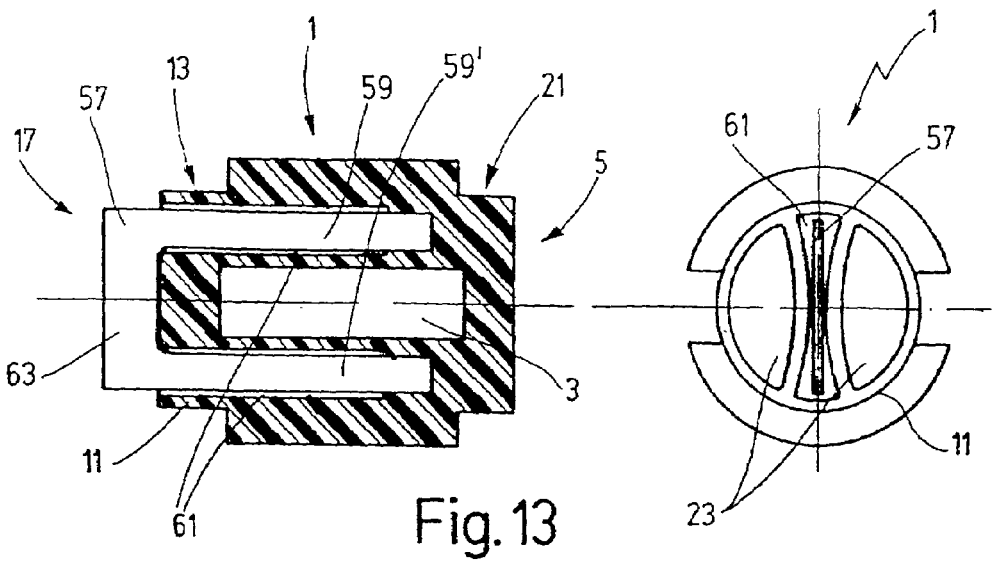
FIGS. 13 and 14 each a longitudinal section and a plan view of the drive-side frontal view of two exemplary embodiments of a rotor having a drive element.

FIG. 13 shows a longitudinal section and a plan view of the drive-side frontal side 17 of an additional exemplary embodiment of a rotor 1 which is formed as one piece and consists of plastic. Here the rotor 1 includes an elastic drive element 57 working together with the drive shaft not represented, said drive element consisting, for example, of sheet metal, preferably spring metal. The legs 59 and 59' of the U-shaped drive element 57 are each introduced into a recess 61 in the rotor 1. The end areas of the two legs are molded in the rotor 1 whereby the drive element 57 is connected irremovably to the rotor 1. The recesses 61 extend from the frontal face 24 of the first support 13 up to beyond the central area of the rotor, whereby the size of the recesses is chosen so large that the legs 59 and 59' can move with respect to the rotor in the area of the recesses. The section 63 of the unipartite drive element 57 connecting the legs 59 and 59' projects over the frontal face 24. The arrangement of the recesses 61 is chosen so that the legs 59 and 59' enclose a large area of the slot 3 in which the blade of the vacuum pump is guided. Due to this structure the drive moment here is conducted directly into the areas of the rotor on which the blade of the vacuum pump mounted displaceably in the slot 3 is supported.

In the mounted state of the vacuum pump the drive element 57 engages with its section 63 in a slot in the drive shaft. In the case of a rotation of the drive shaft the drive moment is conducted into the rotor via the drive element 57 where the elastic drive element 57 smooths spikes in the torque which may arise.

Figure 14:
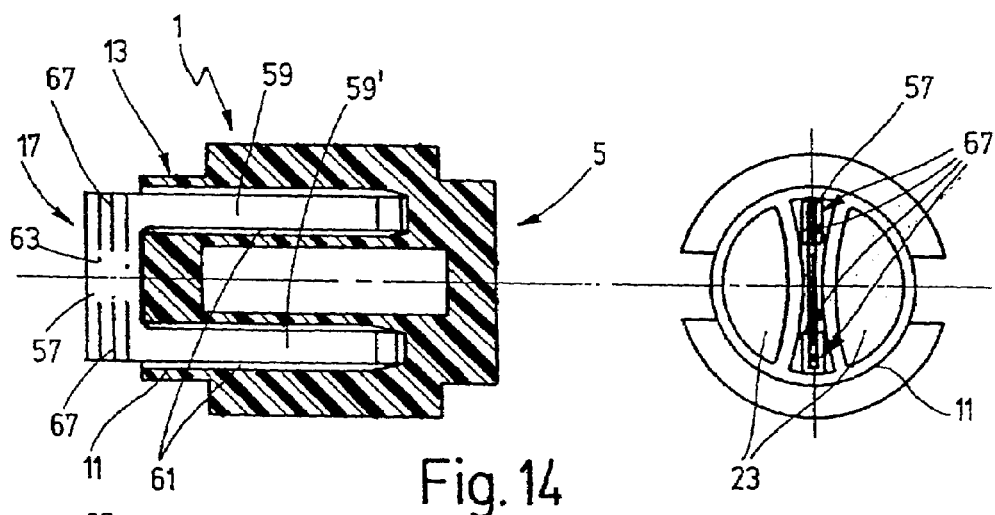

In the case of the exemplary embodiment represented in FIG. 14 the legs 59 and 59' each have in their end areas two pressure points 67 whereby a convex arch is formed on one side of the drive element and a concave arch is formed on the other side. The pressure points in the legs 59 and 59' are introduced on different sides of the drive element so that the convex arches of the legs are also located on different sides of the drive element. The convex arches in the ends of the legs serve for the purpose of clamping the two legs 59 and 59' in the recess 61 so that the drive element 57 is held securely on or in the rotor. The force of compression required to bring the legs into the recesses is relatively slight. So that the section 63 of the drive element 57 engaging in a slot of the drive shaft can also be disposed free of play in this slot, the section 63 has on each side of the drive element two pressure points 67 in whose area the drive element has a concave or convex arch. Through the pressure points 67 introduced on both sides a back and forth striking of the legs in the recesses and the section 63 in the slot of the drive shaft during an oscillating motion of the drive element 57, for example as a consequence of oscillations in the torque, is prevented since the drive element 57 lies in this area with both sides in the recesses or the slot.

Figure 15:
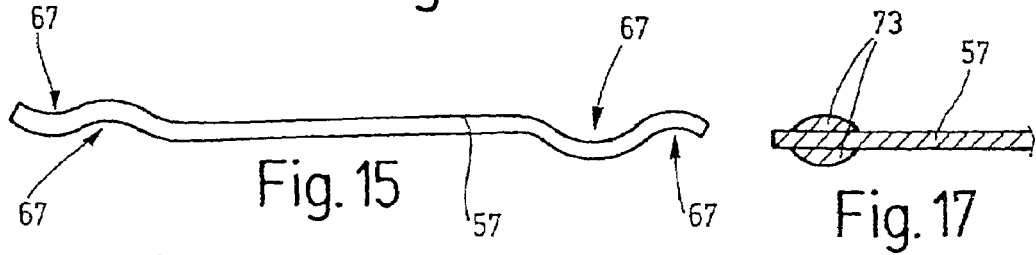
FIG. 15 a plan view of an exemplary embodiment of the drive element.
Figure 16:
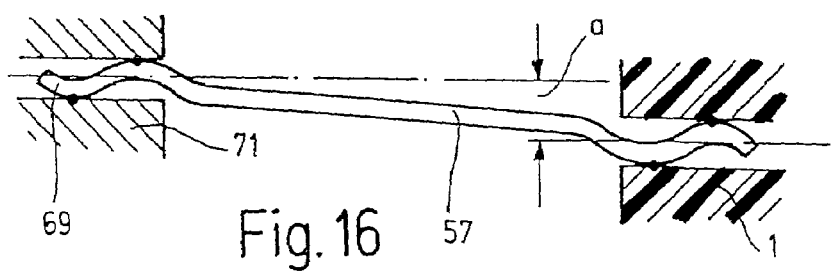
FIG. 16 a plan view of the drive element represented in FIG. 15 in the mounted state.

FIG. 15 shows a lateral view of an additional exemplary embodiment of an extended drive element 57 which has at each of its ends, on opposite sides, two pressure points 67 whereby concavely and convexly curved areas are formed. With the aid of the elastic drive element 57 a shift a of the axis between the vacuum pump and the drive shaft can be compensated, as can be seen from FIG. 16, without a coupling being necessary for that purpose. As is represented in FIG. 16 the drive element 57 projects for this purpose into a slot 69 of a drive shaft 71. The other end of the drive element 57 projects into a slot or into a recess in the rotor 1. Due to this structure a shift of the axis can be compensated in the longitudinal extension of the slot 69 by the drive element 57 being displaced in the slot 69. A shift of the axis perpendicularly to the longitudinal extension of the slot 69 is achieved in the case of a drive element fixedly connected to the rotor by the fact that it is bent in its elastic range. If the drive element is guided with play in the slot or the recess of the rotor, then it tilts on transmission of the torque to a wall of the slot. In FIG. 16 the bearing areas of the drive element 57 on the walls of the slot are indicated in the drive shaft and in the rotor with dots.

Figure 17:
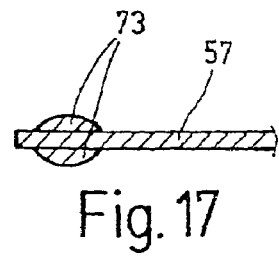
FIG. 17 a greatly enlarged extract of an end area of a fourth exemplary embodiment of the drive element.

Alternatively to the exemplary embodiment of the drive element 57 represented in FIG. 15 it can also have, instead of the pressure points 67 in its end area as represented in FIG. 17, ball-like surface sections 73 which are formed on both sides of the drive element 57 by a coating of material or are connected to the drive element 57 as one piece. Thereby it is insured that the drive moment is not transmitted via the edges of the thin drive element 57 but rather via surfaces.

Figure 18:
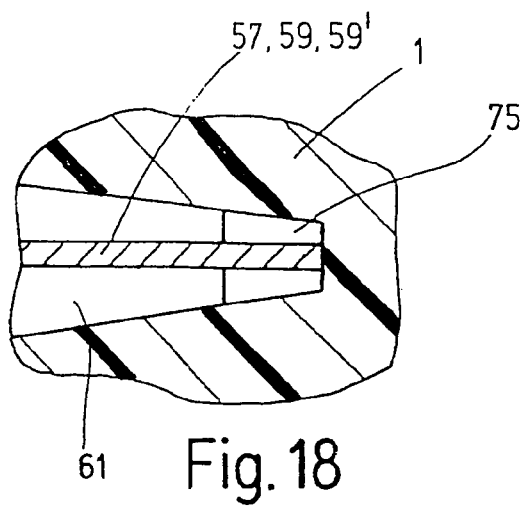
FIG. 18 an extract of a rotor in the area of the base of a recess for the drive element.
Figure 19:
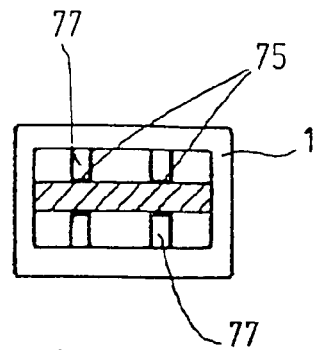
FIG. 19 a plan view of the recess represented in FIG. 18.

FIG. 18 shows an extract of a rotor 1 in the area of a recess 61 for the legs 59 and 59' of the U-shaped drive element in whose base an accommodation 75 for the clamp fastening of the end areas of the legs is provided. As can be seen from FIG. 19, which shows a plan view of the recesses 61 in the rotor, an accommodation 75 is provided for each leg of the drive element 57 which are formed by a stud 77 which has a slot into which a leg of the drive element is pressed.

Figure 20:
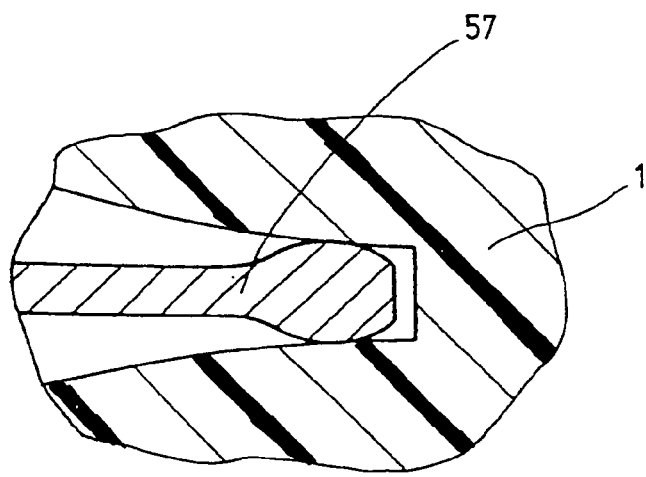
FIG. 20 an extract of an additional exemplary embodiment of a drive element in its end area.

FIG. 20 shows a drive element 57 plugged with play into a recess 61 in the rotor 1, said drive element being able to compensate a shift of axis by tilting. The drive element 57 is formed on both sides as a ball in its bearing surface, that is, the drive element has at its end areas on both sides a convex arch. It is particularly advantageous in the case of the exemplary embodiment represented in FIG. 20 that through tilting of the drive element in case of a shift of axis no additional supporting force arises but rather that only the torque is conducted into the rotor. The ball-like end areas of the drive element 57 prevent the torque from being transmitted via the edges but rather via ball-like surfaces.

Figure 21:
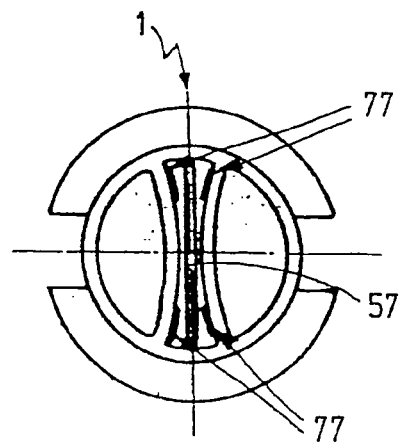
FIG. 21 a plan view of the drive-side frontal view of an additional exemplary embodiment of the rotor.

The recesses 61 in the rotor 1 accommodating the drive element 57 are preferably structured so that the drive element 57 deforming under pressure comes to bear on a stop before the range of plastic deformation is reached. For this purpose several stop surfaces 77 are provided in the case of the exemplary embodiment represented in FIG. 21 which are disposed on both sides of the drive element 57.

Figure 22:
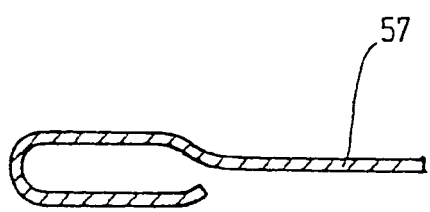
FIG. 22 a plan view of the end area of an additional exemplary embodiment of the drive element.

FIG. 22 shows an end area of an exemplary embodiment of the drive element 57 which is doubly angled off here whereby in an advantageous manner it can be adapted to slots of different size in the drive shaft and the rotor.

Figure 23:
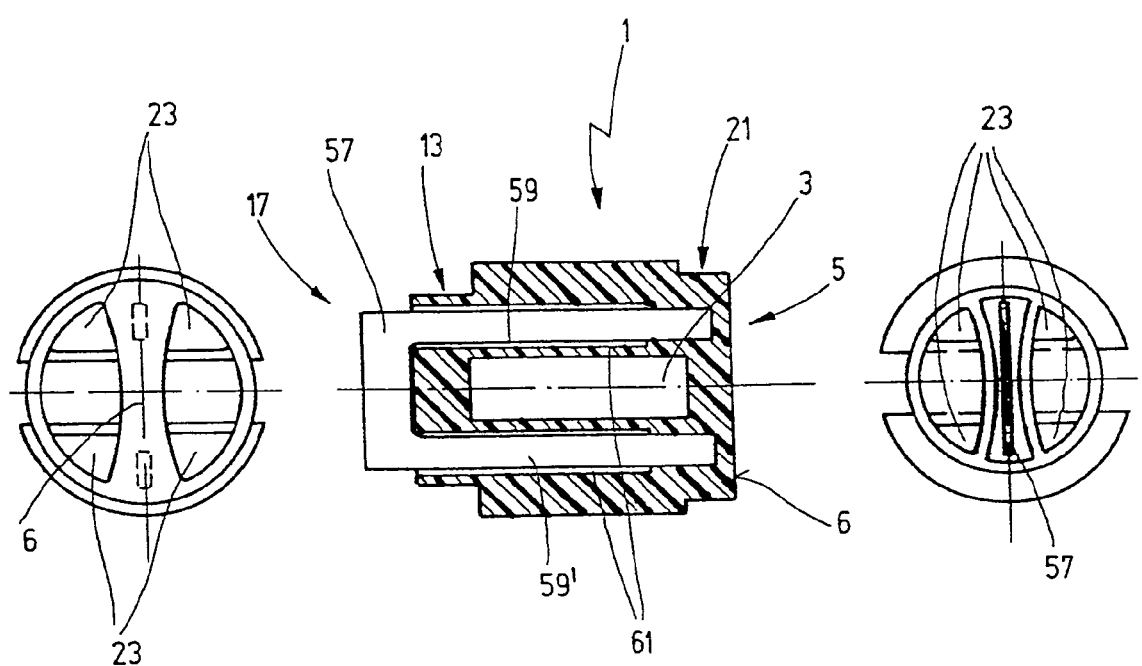
FIG. 23 three images of an additional exemplary embodiment of the rotor according to the invention.

FIG. 23 shows three images of an additional exemplary embodiment of the rotor 1 which has a drive element 57 described with the aid of the preceding figures and several cavities 23 introduced from both frontal sides 5 and 17 which serve to reduce the weight of the rotor. As can be seen from the images of FIG. 23 the walls of the rotor 1 have thicknesses appropriate to plastic. Here the legs 59 and 59' of the drive element 57 are so long that they encircle the slot 3 for the blade completely and reach up to the second support 21. The end of the legs are completely encircled by the rotor material and thus are irremovably connected to the rotor. Due to this structure the drive moment is conducted directly into the end of the rotor turned away from the drive so that the remaining areas of the rotor 1 are at least essentially free of stress.

In summary it remains to be said that by making the rotor from plastic the costs for the vacuum pump can clearly be reduced. The plastic rotor has with respect to rotors consisting of metal only a light weight which is further reduced by at least one cavity. The cavities can be formed in the case of a rotor produced in the injection-molding process by laying cores into the injection mold or after the production of the rotor by subsequent machining. The form, structure, and the number of cavities can vary and is, for example, determined by the drive moment which can be applied to the rotor. Furthermore, each cavity-possessing form of embodiment of the rotor can be provided with reinforcing ribs 31 as are described with the aid of FIGS. 8A and 8B.

Since the vacuum pump can also be disposed in areas in which high temperatures prevail, for example in the motor space of a motor vehicle, the rotor is made of plastic in the case of a preferred exemplary embodiment whose durability can be insured preferably at least to 80° C. Obviously those plastics can also be used which do not lose, at least essentially, their strength characteristics at least up to 140° C. and above.

Independently of the structural development of the rotor it can be driven either directly by the drive shaft or via a coupling. The forms of embodiment of the rotor in which no coupling is provided or required are preferred since by omitting the coupling the costs for the vacuum pump can be reduced. In the case of a direct drive of the rotor the form of embodiment is preferred which has a drive element described with the aid of the figures which weakens and smooths spikes and oscillations in torque. Thereby a compactly structured rotor with only slight wall thicknesses can be realized even when the drive moment is high.

From the figures it can be seen that merely those forms of embodiment of the rotor which are driven neither via a coupling nor an above-described elastic drive element have a first longitudinal section 7 which is preferably formed as a double surface.

What is claimed is:

1. A vacuum pump comprising:
a drivable rotor having a blade in a housing which can be set in rotation, the rotor being comprising plastic and being formed as one piece, the rotor comprising a first longitudinal section configured for being coupled to a drive shaft via which a torque can be transmitted from a drive shaft to the rotor and that the first longitudinal section being formed as one piece with the rotor and wherein the rotor comprises first and second support sections, characterized in that the rotor comprises a second longitudinal section and a third longitudinal section and the second and the third longitudinal sections being formed as one piece with the rotor and the rotor has one slot for the receipt of one blade, said one slot being disposed in the third longitudinal section.

2. A vacuum pump according to claim 1, wherein the rotor has at least one cavity open at the edge.

3. A vacuum pump according to claim 2, wherein the cavity is introduced from a position consisting of the group consisting of the drive-side frontal side of the rotor and the frontal face of the rotor turned away from the drive.

4. A vacuum pump according to claim 1, wherein the rotor comprises walls having a slight thickness.

5. A vacuum pump according to claim 1, wherein the rotor comprises two wall areas and a transition between the two wall areas of the rotor having a different thickness, the which is continuous.

6. A vacuum pump according to claim 1, wherein the slot has a diameter is smaller than the rotor diameter in the area of the slot in which the blade is displaceable.

7. A vacuum pump according to claim 1, wherein the rotor has a diameter and a slot and wherein the rotor has at least one support whose diameter is the same as the rotor diameter in the area of the slot in which the blade is displaceable.

8. A vacuum pump according to claim 1, wherein the rotor has a slot and two supports and wherein a diameter of at least one of the supports is smaller than the rotor diameter in the area of the slot.

9. A vacuum pump according to claim 1, wherein the rotor has at least two cavities disposed next to one another which are separated from one another by a rib.

10. A vacuum pump according to claim 9, wherein the rotor has wall areas and wherein the rib is thinner than the rest of the wall areas of the rotor.

11. A vacuum pump according to claim 1, further comprising a coupling formed by a disk and wherein the rotor can be energized with a torque via the coupling.

12. A vacuum pump according to claim 11, wherein the disk has a thickness and a diameter, and wherein the ratio of the thickness (b) and the diameter (d) of the disk lies in a range of $0.14 \leq b/d \leq 0.3$.

13. A vacuum pump according to claim 1, wherein the rotor has a drive segment having a support length (l) and the rotor having a diameter and wherein the diameter (D) of the rotor lies in a range of $0.35 \leq l/D \leq 0.65$.

14. A vacuum pump according to claim 1, further comprising at least two drive segments which are connected to one another by a closed ring.

15. A vacuum pump according to claim 1, further comprising a coupling having a drive mechanism selected from the group consisting of a long hole in which a drive shaft engages and a drive tongue which engages in a corresponding slot in a drive shaft.

16. A vacuum pump according to claim 15, wherein the drive tongue has a double surface formed by a first longitudinal section of the rotor which is provided with a vat-like cap preferably consisting of sheet metal.

17. A vacuum pump according to claim 1, wherein the rotor has an elastic drive element working together with a drive shaft.

18. A vacuum pump according to claim 1, further comprising a drive element.

19. A vacuum pump according to claim 18 wherein the drive element is spring steel.

20. A vacuum pump according to claim 18, wherein drive element projects into a slot in a drive shaft and is displaceably guided in it.

21. A vacuum pump according to claim 20, wherein the drive element engages in a slot-like recess in the rotor.

22. A vacuum pump according to claim 18, wherein the drive element is held undisplaceably in the recess.

23. A vacuum pump according 18, wherein the drive element is embedded in the rotor.

24. A vacuum pump according to claim 18, of the preceding claims characterized by the fact that the drive element is formed in the shape of a U.

25. A vacuum pump according claim 18, wherein the rotor comprises at least one stop surface during the energizing of the drive element with a torque.

26. A vacuum pump according to claim 25, wherein the drive element is formed as a ball in a bearing area of the rotor.

27. A vacuum pump according to claim 18, wherein the rotor has at least on stop for the drive element.

28. A vacuum pump according to claim 18, wherein the drive element is angled off at an end engaging a recess in the rotor.

29. A vacuum pump according to claim 1, wherein the rotor is disposed in communication with a motor.

30. A vacuum pump according to claim 1, wherein the rotor has a first longitudinal section which can be coupled to a drive shaft via which a torque can be transmitted from the drive shaft to the rotor and that the first longitudinal section is formed as one piece with the rotor.

31. A vacuum pump according to claim 1, further comprising
 a coupling having a bearing surface; and
 an opposing surface disposed at the rotor for each bearing surface of the coupling where a torque transmitted from a drive shaft can be conducted into the rotor via the opposing surface.

32. A vacuum pump according to claim 31, wherein the rotor has at least one cavity open at the edge.

33. A vacuum pump according to claim 32, wherein the cavity is introduced from a position consisting of the group consisting of the drive-side frontal side of the rotor and the frontal face of the rotor turned away from the drive.

34. A vacuum pump according to claim 31 characterized by the fact that the opposing surface is located on a drive segment projecting over the drive-side frontal surface of the rotor (1).

35. A vacuum pump according to claim 31, wherein the rotor has walls having a slight thickness.

36. A vacuum pump according to claim 31, wherein the rotor comprising two wall areas and a transition between the two wall areas of the rotor having a different thickness which is continuous.

37. A vacuum pump according to claim 31, wherein the rotor has a slot and at least one support having a diameter is smaller than the rotor diameter in the area of the slot in which the bade is displaceable.

38. A vacuum pump according to claim 31, wherein the rotor has a diameter and a slot and wherein the rotor has at least one support whose diameter is the same size as the rotor diameter in the area of the slot in which the blade is displaceable.

39. A vacuum pump according to claim 31, wherein the rotor has a slot and two supports and wherein a diameter of at least one of the supports is smaller than the rotor diameter in the area of the slot.

40. A vacuum pump according to claim 31, wherein the rotor has at least two cavities disposed next to one another which are separated from one another by a rib.

41. A vacuum pump according to claim 40, wherein the rotor has wall areas and wherein the rib is thinner than the rest of the wall areas of the rotor.

42. A vacuum pump according to claim 31, further comprising a coupling formed by a disk and wherein the rotor can be energized with a torque via the coupling.

43. A vacuum pump according to claim 42, wherein the disk has a thickness and a diameter, and wherein the ratio of the thickness (b) and the diameter (d) of the disk lies in a range of $0.14 \leq b/d \leq 0.3$.

44. A vacuum pump according to claim 31, wherein the disk has a drive segment having a support length (l) and the rotor having a diameter and wherein the diameter (D) of the rotor lies in a range of $0.35 \leq l/D \leq 0.65$.

45. A vacuum pump according to claim 31, further comprising at least two drive segments which are connected to one another by a closed ring.

46. Vacuum pump according to claim 31, further comprising a coupling having a drive mechanism selected from the group consisting of a long hole in which the drive shaft engages and a drive tongue which engages in a corresponding slot in a drive shaft.

47. A vacuum pump according to claim 46, wherein the drive tongue has a double surface formed by a first longitudinal section of the rotor which is provided with a vat-like cap preferably consisting of sheet metal.

48. A vacuum pump according to claim 31, wherein the rotor has an elastic drive element working together with a drive shaft.

49. A vacuum pump according to claim 31, further comprising a drive element.

50. A vacuum pump according to claim 49, wherein the drive element projects into a slot in a drive shaft and is displaceably guided in it.

51. A vacuum pump according to claim 50, wherein the drive element engages in a slot-like recess in the rotor.

52. A vacuum pump according to claim 49, wherein the drive element is held undisplaceably in the recess.

53. A vacuum pump according 49, wherein the drive element is embedded in the rotor.

54. A vacuum pump according to claim 49, wherein the drive element is formed in the shape of a U.

55. A vacuum pump according claim 49, wherein the rotor comprises at least one stop surface during the energizing of the drive element with a torque.

56. A vacuum pump according to claim 55, wherein the drive element is formed as a ball in a bearing area of the rotor.

57. A vacuum pump according to claim 49, wherein the rotor has at least one stop for the drive element.

58. A vacuum pump according to claim 49, wherein the drive element is angled off at an end engaging a recess in the rotor.

59. Vacuum pump according to claim 31, wherein the rotor is disposed in communication with a motor.

60. A vacuum pump according to claim 31, wherein the rotor has a first longitudinal section which can be coupled to a drive shaft via which a torque can be transmitted from the drive shaft to the rotor and that the first longitudinal section is formed as one piece with the rotor.

61. A vacuum pump according to claim 1, wherein the rotor has at least two cavities which are each introduced from a frontal side of the rotor and that the rotor has at least one closed wall running transversely or essentially transversely to the central longitudinal axis of the rotor, said wall separating the cavities from one another in the axial direction.

62. A vacuum pump according to claim 61, wherein the cavities extend in the axial direction into the central area of the rotor.

63. A vacuum pump according to claim 61, wherein the rotor has walls have a slight thickness.

64. A vacuum pump according to claim 61, wherein the rotor comprises two wall areas and a transition between the two wall areas of the rotor having a different thickness which is continuous.

65. A vacuum pump according to claim 61, wherein the rotor has a slot and at least one support having a diameter is smaller than the rotor diameter in the area of the slot in which the blade is displaceable.

66. A vacuum pump according to claim 61, wherein the rotor has a diameter and a slot and wherein the rotor has at least one support whose diameter is the same size as the rotor diameter in the area of the slot in which the blade is displaceable.

67. A vacuum pump according to claim 61, wherein the rotor has a slot and two supports and wherein a diameter of at least one of the supports is smaller than the rotor diameter in the area of the slot.

68. A vacuum pump according to claim 61, wherein the rotor has at least two cavities disposed next to one another which are separated from one another by a rib.

69. A vacuum pump according to claim 68, wherein the rotor has wall areas and wherein the rib is thinner than the rest of the wall areas of the rotor.

70. A vacuum pump according to claim 61, further comprising a coupling formed by a disk and wherein the rotor (1) can be energized with a torque via the coupling.

71. A vacuum pump according to claim 70, wherein the disk has a thickness and a diameter, and wherein the ratio of the thickness (b) and the diameter (d) of the disk lies in a range of $0.14 \leq b/d \leq 0.3$.

72. A vacuum pump according to claim 61, wherein the rotor has a drive segment having a support length (l) and the rotor having a diameter and wherein the diameter (D) of the rotor lies in a range of $0.35 \leq l/D \leq 0.65$.

73. A vacuum pump according to claim 61, further comprising at least two drive segments which are connected to one another by a closed ring.

74. A vacuum pump according to claim 61, further comprising a coupling having a drive mechanism selected from the group consisting of a long hole in which the drive shaft engages and a drive tongue which engages in a corresponding slot in a drive shaft.

75. A vacuum pump according to claim 73, wherein the drive tongue has a double surface formed by a first longitudinal section of the rotor which is provided with a vat-like cap preferably consisting of sheet metal.

76. A vacuum pump according to claim 61, wherein the rotor has an elastic drive element working together with a drive shaft.

77. A vacuum pump according to claim 61, further comprising a drive element.

78. A vacuum pump according to claim 77, wherein drive element projects into a slot in a drive shaft and is displaceably guided in it.

79. A vacuum pump according to claim 77, wherein the drive element engages in a slot-like recess in the rotor.

80. A vacuum pump according to claim 77, wherein the drive element is held undisplaceably in the recess.

81. A vacuum pump according 77, wherein the drive element is embedded in the rotor.

82. A vacuum pump according to claim 77, wherein the drive element is formed in the shape of a U.

83. A vacuum pump according to claim 77, wherein the rotor comprises at least one stop surface during the energizing of the drive element with a torque.

84. A vacuum pump according to claim 77, wherein the drive element is formed as a ball in a bearing area of the rotor.

85. A vacuum pump according to claim 77, wherein the rotor has at least one stop for the drive element.

86. A vacuum pump according to claim 77, wherein the drive element is angled off at an end engaging a recess in the rotor.

87. Vacuum pump according to claim 61, wherein the rotor is disposed in communication with a motor.

88. A vacuum pump according to claim 61, wherein the rotor has a first longitudinal section which can be coupled to a drive shaft via which a torque can be transmitted from the drive shaft of the rotor and that the first longitudinal section is formed as one piece with the rotor.

89. A vacuum pump according to claim 61, wherein rotor has a opposing surface and further comprising a coupling having a bearing surface of a coupling where a torque transmitted from the drive shaft can be conducted into the rotor via the opposing surface.

90. A vacuum pump according to claim 61, wherein the rotor has at least one cavity open at the edge.

91. A vacuum pump according to claim 90, wherein the cavity is introduced from a position selected from the frontal side of the rotor and from its frontal face (5) turned away from the drive.

* * * * *